Patented Jan. 23, 1934

1,944,732

UNITED STATES PATENT OFFICE 1,944,732

COMPOUNDS HAVING HYDROGENATED RING SYSTEMS AND PROCESS OF PREPARING THEM

Otto Diels and Kurt Alder, Kiel, Germany, assignors to I. G. Farbenindustrie Aktiengesellschaft, Frankfort-on-the-Main, Germany No Drawing. Original application October 29, 1928, Serial No. 315,915, and in Germany November 5, 1927. Divided and this application January 13, 1930. Serial No. 420,626

16 Claims. (Cl. 260—136)

The present invention relates to compounds having hydrogenated ring systems and to processes of preparing them.

This invention is based on the discovery that compounds with a system of "conjugated—C—C—double bonds", as for instance butadiene, cyclopentadiene, phellandrene, myrcene or the like easily form condensation products with acrylic acid, acrolein and other unsaturated compounds of the following general formula:

wherein $R_1$ stands for a

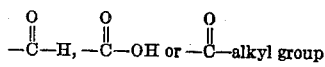

and $R_2$ for hydrogen or alkyl in such a manner that the last named compounds are firmly linked to the systems with conjugated carbon—carbon double bonds, the double bond in 1:4 position being opened up.

Also pyrrol and substituted pyrrols, furthermore furanes and other similar compounds are likewise susceptible of reacting with the aforesaid compounds.

Thus acrolein, acrylic acid and ethylidene acetone react for instance easily with cyclopentadiene with formation of the corresponding monobasic hydrogenated acid and aldehyde and ketone respectively:

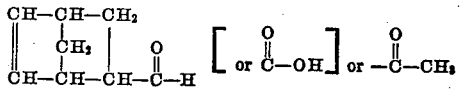

The above described condensation of acrylic acid, acrolein and the like with the respective other systems is fundamentally novel.

By means of these new reactions a large number of compounds can easily be produced by synthesis which, as for instance, terpenes, sesquiterpenes, alkaloids, camphors and similar hydrogenated cyclic compounds, have hitherto not been obtainable by a synthetic process and which are of great technical importance. The present invention is, therefore, of a very great value for industrial purposes.

The following examples illustrate the invention:

(1) *Endomethylene-3:6 tetrahydro Δ⁴ benzaldehyde*

A solution of 10 parts by weight of acrolein in 15 parts by weight of ether is mixed with 14 parts by weight of cyclopentadiene. The reaction sets in with evolution of heat. When the conversion is complete the product is fractionated in a vacuum in a current of carbon dioxide. Its boiling point is 70° C.–72° C. under 620 mm. pressure. The yield amounts to about 95 per cent of the theory. The aldehyde is a colorless, refractive oil of a characteristic, extremely clinging odor, reminiscent of valeric aldehyde. It is characterized by a well crystallizing bisulphite compound, by a semicarbazone of melting point 160° C. and by a beautifully crystallizing condensation product with cyclohexanone melting at 104° C.–105° C.

(2) *Endomthylene 3:6 tetrahydro Δ⁴ benzoic acid*

Molecular proportions of acrylic acid and cyclopentadiene are mixed together. Heat is evolved and when the reaction is complete, the product is distilled under diminished pressure. Thus endomethylene 3:6 tetrahydrobenzoic acid is obtained as an oil of intense valerian odor. The boiling point is 128° C.–130° C. under a pressure of about 15 mm.

(3) *Reaction of crotonic aldehyde with myrcene*

10 parts by weight of myrcene and 10 parts by weight of crotonic aldehyde are heated in a pressure vessel to 150° C. The reaction mixture is subjected to the distillation in a vacuum, whereby the aldehyde is obtained as a transparent oil at 143° C. to 144° C. under 12 mm. pressure. By a repeated distillation it is obtained in an entirely pure state. It probably has the following constitution:

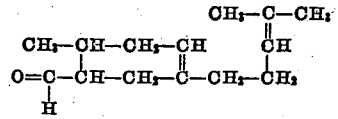

(4) *Reaction of crotonic aldehyde with α-phellandrene*

10 parts by weight of α-phellandrene and 10 parts by weight of crotonic aldehyde are caused to react with one another under the above indicated conditions. The reaction mass is worked up in an analogous manner and the new aldehyde is obtained at 143° C. to 144° C. under 18 mm. pressure. Its smell and appearance are the same as those of the other aldehydes above described. It probably has the following constitution:

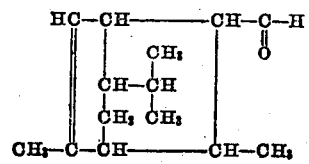

(5) *Reaction of acrolein with α-phellandrene*

10 parts by weight of acrolein are caused to react with 22 parts by weight of α-phellandrene in the aforesaid manner. When distilling the reaction mixture in a vacuum, the almost pure aldehyde distils over at 128° C.-130° C., under a pressure of 12 mm. and is obtained in an entirely pure state by repeating the distillation. The aldehyde is like the above described aldehydes an oil clear as water and is distinguished by the same characteristic odor. It probably has the following constitution:

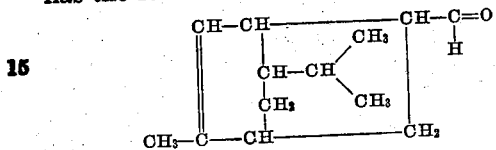

(6) *Reaction of crotonic aldehyde with butadien*

5 parts by weight of butadien and 13 parts by weight of crotonic aldehyde are used to react in the above described manner. The reaction product is distilled under reduced pressure. The first runnings consist first in crotonic aldehyde and then of a mixture of crotonic aldehyde and the new body. The fraction which finally distils over at 75° C. under 22 mm. or at 83° C. under 38 mm. pressure is received separately. By once more distilling the latter fraction the pure 6-methyl-Δ³-tetrahydrobenzaldehyde is obtained as a water-clear oil. It probably has the following constitution:

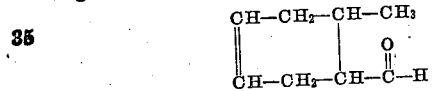

(7) *Reaction of crotonic aldehyde with dimethylbutadiene*

5 parts by weight of 2.4-dimethylbutadiene (obtained from dimethylbutan-diol of the following formula:

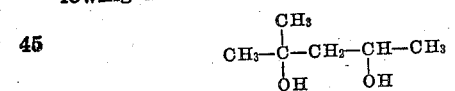

by separation of 2 molecular proportions of water) and 10 parts by weight of crotonic aldehyde are treated in the above described manner. By distillation in a vacuum the reaction product is obtained in an almost pure and by a second distillation in a perfectly pure state. It boils at 81° C. to 82° C. under 12 mm. pressure and probably has the following constitution:

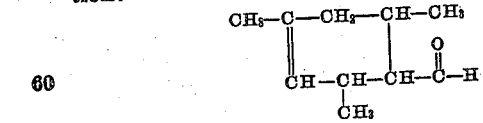

It has the same characteristic smell as the above indicated aldehydes.

(8) *Reaction by crotonic aldehyde with isoprene*

8 parts by weight of isoprene and 12 parts by weight of crotonic aldehyde are treated as indicated in the preceding example. The reaction mixture is distilled in a vacuum. A quantity of crotonic aldehyde first distils over, and afterwards almost pure dimethyl 3:6-Δ³-tetrahydrobenzaldehyde which is obtained in an entirely pure state by a second distillation. It boils at 92° C. to 93° C. under 25 mm. pressure and probably has the following constitution:

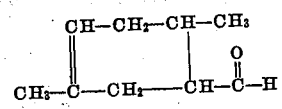

The smell is similar to that of the aldehyde described in the preceding example, but not so penetrating.

(9) *Reaction of crotonic aldehyde with ββ'-dimethylbutadiene*

8 parts by weight of ββ'-dimethylbutadiene and 13 parts by weight of crotonic aldehyde are heated in a pressure vessel to about 150° C. for 5 hours. The reaction product is distilled in a vacuum. Crotonic aldehyde first distils over and then the new trimethyl - 3.4.6-Δ³-tetrahydrobenzaldehyde in an almost pure state. After another distillation in a vacuum it shows the constant boiling point of 89° C. under 12 mm. pressure. It probably has the following constitution:

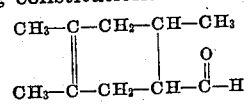

It has a characteristic, slightly penetrating smell.

(10) *Reaction of acrolein with 2.3-dimethylbutadiene*

By heating molecular quantities of 2.3-dimethylbutadiene and acrolein in a pressure vessel to 100° C. for about 3 hours and then fractionating the contents of the vessel in a vacuum, the dimethyl-3.4-Δ³-tetrahydrobenzaldehyde is obtained in a good yield as a colorless oil of an intense odor of leaves and boiling at 79° C. under 10 mm. pressure. It has probably the following constitution:

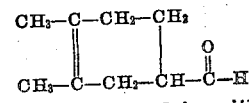

(11) *Reaction of acrolein with isoprene*

Acrolein is easily condensed with isoprene in a pressure vessel by heating the components to 100° C. as it has been described in the preceding example given for dimethyl-2.3-butadiene.

The methyl 3.-(4?)-Δ³-tetrahydrobenzaldehyde thus obtained in a good yield is very similar to its homologues as regards its smell, behavior and appearance. It has probably the following constitution:

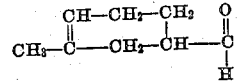

It boils at 63° C.-64° C. under 10 mm. pressure.

(12) *Reaction of acrolein with myrcene*

Myrcene is easily condensed with acrolein by heating the two components in a pressure vessel to 100° C.

The isohexenyl-3-(4?)-Δ³- tetrahydrobenzaldehyde thus obtained is a colorless oil of a very agreeable intensity fruit-like odor. It boils at 140° C. to 142° C. under 10 mm. pressure. It probably has the following constitution:

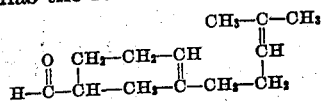

(13) Reaction of acrolein with 2.4-dimethylbutadiene

This reaction is easily effected by heating molecular quantities of 2.4-dimethylbutadiene and acrolein in a pressure vessel to 100° C. for about three hours. The aldehyde thus obtained is very similar to that of its above described isomeride. It is a colorless liquid of an intensely grass-like odor boiling at 86° C. to 88° C. under 12 mm. pressure and probably has the following constitution:

$$CH_3-C-CH_2-CH_2\quad O$$
$$\quad\|\qquad\qquad\quad\|$$
$$CH-CH-CH-C$$
$$\qquad\ |\qquad\qquad\ |$$
$$\quad\ CH_3\qquad\ H$$

(14) Reaction of cyclopentadiene with crotonic aldehyde 8 parts by weight of crotonic aldehyde are heated in a pressure vessel with 10 parts by weight of freshly distilled cyclopentadiene to about 100° C. for 4 hours. The reaction mixture is then distilled in a vacuum, whereby under 12 mm. pressure a colorless oil is obtained distilling over at 60° C. to 85° C. and representing a mixture of two stereo isomeric aldehydes. They probably have the following constitution:

$$CH-CH-CH-CH_3$$
$$\|\quad\ CH_2\qquad\quad O$$
$$CH-CH-CH-C$$
$$\qquad\qquad\qquad\ |$$
$$\qquad\qquad\qquad\ H$$

(15) 84 parts by weight of ethylidene-acetone of the formula $CH_3-CH=CH-CO-CH_3$ and 99 parts by weight of freshly distilled cyclopentadiene are heated in a pressure vessel to 150° C. for 5 hours. The feebly greenish-yellow liquid is distilled in a vacuum. The main fraction boils at 76° C.–80° C. under 13 mm. pressure. It is a transparent mobile oil of a camphor-like odor.

This application is a division of our application Ser. No. 315,915 filed October 29, 1928.

We claim:

1. The process of preparing compounds having a hydrogenated ring system which comprises causing a compound of the following formula:

$$\begin{array}{c} R_1\ \ R_2 \\ |\ \ \ | \\ HC=CH \end{array}$$

wherein $R_1$ stands for a $$\begin{array}{ccc} O & O & O \\ \| & \| & \| \\ -C, & -C\ \text{or} & -C-\text{alkyl group} \\ | & | & \\ H & OH & \end{array}$$

and $R_2$ for hydrogen or alkyl to react with a compound containing a system of two conjugated carbon-carbon double bonds.

2. The process of preparing compounds having a hydrogenated ring system which comprises causing a compound of the following formula:

$$\begin{array}{c} R_1\ \ R_2 \\ |\ \ \ | \\ HC=CH \end{array}$$

wherein $R_1$ stands for a $$\begin{array}{ccc} O & O & O \\ \| & \| & \| \\ -C, & -C\ \text{or} & -C-\text{alkyl group} \\ | & | & \\ H & OH & \end{array}$$

and $R_2$ for hydrogen or alkyl to react with a compound of the following formula:

$$\begin{array}{c} H\quad\quad H \\ |\quad\quad\ | \\ C=C-C=C \\ |\ \ \ |\ \ \ \ |\ \ \ | \\ X\ \ X\ \ \ X\ \ X \end{array}$$

wherein X stands for hydrogen or two of the X's stand for alkyl.

3. The process of preparing compounds having a hydrogenated ring system which comprises causing a compound of the following formula:

$$\begin{array}{c} R_1\ \ R_2 \\ |\ \ \ | \\ HC=CH \end{array}$$

wherein $R_1$ stands for a $$\begin{array}{ccc} O & O & O \\ \| & \| & \| \\ -C, & -C\ \text{or} & -C-\text{alkyl group} \\ | & | & \\ H & OH & \end{array}$$

and $R_2$ for hydrogen or alkyl to react with a compound of the following formula:

$$H_2C=C-C=CH-X_3$$
$$\qquad\ |\ \ \ |$$
$$\quad\ X_1\ X_2$$

wherein $X_1$, $X_2$ and $X_3$ stand for hydrogen or two of the X's stand for alkyl.

4. The process of preparing compounds having a hydrogenated ring system which comprises causing a compound of the following formula:

$$\begin{array}{c} O\quad\ R_2 \\ \|\quad\ | \\ C-CH=CH \\ | \\ H \end{array}$$

wherein $R_2$ stands for hydrogen or methyl to react with a compound of the following formula:

$$H_2C=C-C=CH-X_3$$
$$\qquad\ |\ \ \ |$$
$$\quad\ X_1\ X_2$$

wherein $X_1$, $X_2$ and $X_3$ stand for hydrogen or two of the X's stand for alkyl.

5. The process of preparing compounds having a hydrogenated ring system which comprises causing a crotonic aldehyde to react with a compound of the followng formula:

$$H_2C=C-C=CH-X_3$$
$$\qquad\ |\ \ \ |$$
$$\quad\ X_1\ X_2$$

wherein $X_1$, $X_2$ and $X_3$ stand for hydrogen or methyl and at least one X must be hydrogen.

6. The process of preparing compounds having a hydrogenated ring system which comprises causing crotonic aldehyde to react with a compound of the following formula:

$$H_2C=C-C=CH-CH_3$$
$$\qquad\ |\ \ \ |$$
$$\quad\ X_1\ H$$

wherein $X_1$ stands for hydrogen or methyl.

7. The process of preparing compounds having a hydrogenated ring system which comprises causing crotonic aldehyde to react with 2.4-dimethylbutadiene.

8. Compounds of the following probable formula:

$$\begin{array}{c} OH \\ / \\ R_3-C\quad R_5\ \ CH-R_2 \\ \|\quad\quad\quad\quad\quad O \\ R_4-C\quad R_6\ \ CH-C-R_1 \\ \ \backslash\ \ / \\ \ CH \end{array}$$

wherein each of $R_1$, $R_2$, $R_3$ and $R_4$ is hydrogen or alkyl, $R_5$ is hydrogen and $R_6$ is hydrogen or alkyl or $R_5$ and $R_6$ together form an alkylene chain contained within a ring of six carbon atoms, as indicated above, and in every instance at least one of $R_2$, $R_3$, $R_4$ and $R_6$ is hydrogen, said compounds being obtainable by causing a compound of the formula:

wherein $R_1$ stands for a

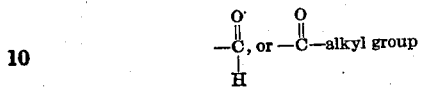

and $R_2$ for hydrogen or alkyl to react with a compound containing a system of two conjugated carbon-carbon double bonds.

9. Compounds of the following formula:

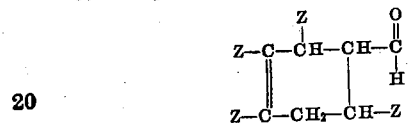

wherein Z stands for hydrogen or alkyl and at least one Z must be hydrogen.

10. Compounds of the following formula:

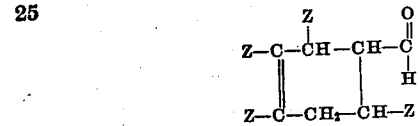

wherein Z stands for hydrogen, methyl and at least one Z must be hydrogen.

11. Compounds of the following formula:

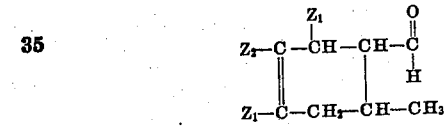

wherein $Z_1$ stands for hydrogen or methyl and $Z_2$ for hydrogen or methyl and at least one Z must be hydrogen.

12. Compounds of the following formula:

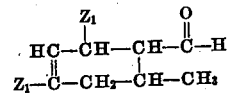

wherein $Z_1$ stands for hydrogen or methyl.

13. The compound probably of the following formula:

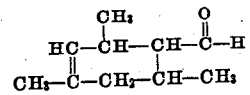

forming an oil and boiling at between 81° C. and 82° C. under a pressure of 12 mm.

14. The compounds of the following formula:

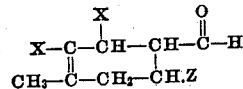

wherein Z stands for hydrogen or a methyl group and one X stands for hydrogen and the other X for a methyl group.

15. The compound of the following formula:

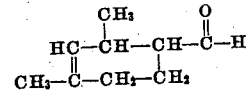

said product being a colorless liquid of an intensely grass-like odor boiling at 86° C. to 88° C. under 12 mm. pressure.

16. The compound of the following formula:

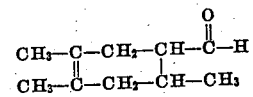

said product boiling at 89° C. under 12 mm. pressure and having a characteristic, slightly penetrating smell.

OTTO DIELS.
KURT ALDER.